US012587864B2

(12) United States Patent
Behling et al.

(10) Patent No.: US 12,587,864 B2
(45) Date of Patent: Mar. 24, 2026

(54) METHODS AND DEVICES FOR OPERATING VEHICLES USING DECENTRALIZED COMMUNICATION

(71) Applicant: Fraunhofer-Gesellschaft zur Förderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 328 days.

(21) Appl. No.: 18/312,695

(22) Filed: May 5, 2023

(65) Prior Publication Data

US 2023/0276247 A1      Aug. 31, 2023

Related U.S. Application Data

(63) Continuation of application No. PCT/EP2021/080786, filed on Nov. 5, 2021.

(30) Foreign Application Priority Data

Nov. 8, 2020    (DE) ......................... 102020214003.0

(51) Int. Cl.
| | |
|---|---|
| *G01C 21/34* | (2006.01) |
| *H04W 16/10* | (2009.01) |
| *H04W 84/18* | (2009.01) |

(52) U.S. Cl.
CPC ........ *H04W 16/10* (2013.01); *G01C 21/3415* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 9,870,003 B2 * | 1/2018 | Neff | ..................... G05D 1/0231 |
| 10,055,985 B1 | 8/2018 | Hayward | |

(Continued)

FOREIGN PATENT DOCUMENTS

| | | |
|---|---|---|
| CN | 102595616 A | 7/2012 |
| CN | 104981021 A | 10/2015 |

(Continued)

OTHER PUBLICATIONS

R. Regele et al., "Kooperative Multi-Roboter-Wegplanung durch heuristische Prioritaetenanpassung", Autonome Mobile Systeme : 19. Fachgespräch Stuttgart, Dec. 8/9 2005; [Informatik Aktuell Series ISSN 1431-472X], Jan. 1, 2006 Springer Verlag, London, GB—ISBN 978-3-540-30291-9 ; ISBN 3-540-30291-3, XP009518887—see English abstract "Cooperative multi-robot path planning using heuristic priority adaptation".

(Continued)

*Primary Examiner* — Jason D Cardone
(74) *Attorney, Agent, or Firm* — Bridgeway IP Law Group, PLLC; Jihun Kim

(57)    ABSTRACT

A vehicle includes a communication interface for providing wireless decentralized communication in a wireless communication environment, a driver for moving the vehicle in a spatial area. The vehicle is configured to emit a position signal comprising information associated with a vehicle position of the vehicle in the spatial area by means of the (Continued)

wireless decentralized communication to inform the wireless communication environment about the vehicle position.

16 Claims, 6 Drawing Sheets

(56) References Cited

U.S. PATENT DOCUMENTS

| | | | | |
|---|---|---|---|---|
| 11,520,623 | B2 * | 12/2022 | Bross | G06F 9/4881 |
| 11,978,129 | B2 * | 5/2024 | Cella | G05D 1/692 |
| 2007/0021915 | A1 | 1/2007 | Breed et al. | |
| 2009/0291692 | A1 | 11/2009 | Kazmi et al. | |
| 2015/0286219 | A1 | 10/2015 | Reichel et al. | |
| 2017/0041931 | A1 | 2/2017 | Feng et al. | |
| 2017/0280416 | A1 * | 9/2017 | Zalewski | H04W 4/46 |
| 2019/0098470 | A1 | 3/2019 | Yukizaki et al. | |
| 2019/0221110 | A1 * | 7/2019 | Vanderveen | G01S 5/0072 |
| 2020/0037129 | A1 * | 1/2020 | Mezaael | H04W 4/029 |
| 2021/0134008 | A1 | 5/2021 | Zhou | |
| 2021/0311159 | A1 * | 10/2021 | Holzmann | G01S 5/0289 |
| 2022/0076032 | A1 * | 3/2022 | Jain | G06V 20/588 |
| 2022/0353732 | A1 * | 11/2022 | Filippou | H04W 28/0289 |
| 2022/0363254 | A1 * | 11/2022 | Baek | B60K 35/80 |

FOREIGN PATENT DOCUMENTS

| | | | |
|---|---|---|---|
| CN | 108202965 | A | 6/2018 |
| CN | 110782693 | A | 2/2020 |
| DE | 102012021282 | A1 | 4/2014 |
| DE | 102017108428 | A1 | 10/2018 |
| JP | 2000 276696 | A | 10/2000 |
| WO | 2015/032436 | A1 | 3/2015 |
| WO | 2017/136001 | A1 | 8/2017 |
| WO | 2020/088234 | A1 | 5/2020 |
| WO | 2022/096652 | A1 | 5/2022 |
| WO | 2022/096653 | A1 | 5/2022 |
| WO | 2022/096655 | A1 | 5/2022 |

OTHER PUBLICATIONS

Koivisto Mike et al., "High-Efficiency Device Positioning and Location-Aware Communications in Dense 5G Networks", IEEE Communications Magazine, vol. 55, No. 8 , pp. 188-195, Aug. 2017, XP011658291.

Anonymous, "Self-driving truck—Wikipedia", Aug. 26, 2020 (Aug. 26, 2020), XP093009481.

Zhenzhen Li, "Office Action for Chinese Application No. 202180075419.1", Aug. 1, 2025, CNIPA, China.

* cited by examiner

METHODS AND DEVICES FOR OPERATING VEHICLES USING DECENTRALIZED COMMUNICATION

CROSS-REFERENCE TO RELATED APPLICATIONS

This application is a continuation of copending International Application No. PCT/EP2021/080786, filed Nov. 5, 2021, which is incorporated herein by reference in its entirety, and additionally claims priority from German Application No. 102020214003.0, filed Nov. 8, 2020, which is also incorporated herein by reference in its entirety.

The present invention relates to vehicles that are set up for communicating among each other by using decentralized communication, such as peer-to-peer communication, and a method for operating the same. The present invention relates in particular to local peer-to-peer (P2P) connections for realizing emergency-critical communication of autonomous vehicles.

BACKGROUND OF THE INVENTION

Automated guided vehicles (AGV) driving at very high speeds need to have knowledge about the routes driven by surrounding vehicles in order to be able to react adequately in case of an emergency, unless the same are centrally controlled.

In not too heavily trafficked environments or at low speeds, merely reactive behavior where the surrounding vehicles are detected via sensor technology is often sufficient. Here, simple movement prediction algorithms, such as Kalman filtering, work. For fast and/or very complex maneuvers, this is no longer ensured, so that it might be needed that, for realizing pro-active route planning, the vehicles communicate their planned routes and in particular deviations therefrom.

In pre-planned routes, actual collision avoidance is realized by the route planning algorithm. However, in reality, unplanned events can occur at any time, such as a technical problem in a vehicle so that the same stops on the route.

Therefore, there is a need that vehicles quickly communicate their positions among each other.

SUMMARY

According to an embodiment, a vehicle may have: a communication interface for providing wireless decentralized communication in a wireless communication environment; driving means for moving the vehicle in a spatial area; wherein the vehicle is configured to emit a position signal including information associated with a vehicle position of the vehicle in the spatial area by means of the wireless decentralized communication to inform the wireless communication environment on the vehicle position.

According to another embodiment, a vehicle may have: a communication interface for providing wireless decentralized communication in a wireless communication environment; driving means for moving the vehicle in a spatial area along a route; wherein the vehicle is configured to receive a position signal including information associated with vehicle position of another vehicle in a spatial area and to adapt the route of the vehicle based on a position of the other vehicle.

Another embodiment may have a wireless communication network having a plurality of inventive vehicles; the wireless communication network including network control means configured to divide the spatial area into a plurality of partial areas and to allocate each partial area a resource subset of a total amount of wireless resources available in the wireless communication network; such that adjacent partial areas differ in at least one wireless resource; wherein the wireless configuration network is configured to transmit, by means of at least one configuration signal to the plurality of vehicles, an instruction to the plurality of vehicles to use, at a positon of a respective vehicle in a specific partial area, resources of the resource subset allocated to the partial area for decentralized communication.

A core idea of the present invention is the finding that by implementing decentralized communication, for example a peer-to-peer connection or P2P connection, infrastructure-induced latencies can be reduced or prevented, such that fast transfer of vehicle position information in a network is enabled.

According to an embodiment, a vehicle includes a communication interface for providing wireless decentralized communication in a wireless communication environment. The vehicle includes driving means for moving the vehicle in a spatial area. The vehicle is configured to emit a position signal comprising information associated with a vehicle position of the vehicle in the spatial area by means of the wireless decentralized communication to inform the wireless communication environment on the vehicle position. By the decentralized communication, latencies caused, for example, by a detour to a central instance of an infrastructure means, can be prevented.

According to an embodiment, the position signal is a first position signal. The vehicle is configured to receive a second position signal comprising information associated with a vehicle position of a different vehicle in the spatial area. The vehicle is configured to adapt its own route of the vehicle based on the position of the other vehicle. In particular, by using decentralized communication, early adaptation of the route can take place, which keeps the requirements regarding computing power or computing time low and enables high vehicle speeds.

According to an embodiment, the decentralized communication includes peer-to-peer communication providing unidirectional or bidirectional communication. Thus, for informing other participants, it can be sufficient to merely transmit the own position information, which allows low network usage or allows implementation with low bandwidths. On the other hand, bidirectional communication can allow the above advantages reciprocally, such that a highly autonomous network can result.

According to an embodiment, the vehicle includes control means configured to obtain partial area information indicating a division of the spatial area into a first partial area and a second partial area. Further, the control means is configured to obtain resource information on a first resource subset of a total amount of available wireless resources of the wireless communication environment allocated to the first partial area and information on a second resource subset of the total amount of available wireless resources allocated to the second partial area. Here, the control means is configured to control the communication interface in dependence on a position of the vehicle in the spatial area to emit, at a first position in the first partial area, the position signal by using the first resource subset and to emit, at a second positon in the second partial area, the position signal by using the second resource subset. Thereby, collisions of transmitted signals can be reduced or prevented, which generally allows faster data throughput as repeated transmissions can be omitted.

According to an embodiment, the first resource subset differs from the second resource subset by a resource including at least one of a frequency domain, a channel, a carrier, a code and a time domain or time slot. This allows that a lower interference load from adjacent spatial partial areas can be expected in a respective resource partial area or spatial partial area.

According to an embodiment, the vehicle is configured to transmit the position signal in a respective partial area by using a resource sub-subset of the resource subset and to configure the wireless communication environment for receiving a signal from another vehicle outside the resource sub-subset in the resource subset. Thus, for example, the vehicle can configure its communication means such that merely a relevant, namely expected, resource subset, such as of the current spatial area and possibly adjacent spatial areas is monitored, while other spatial areas or allocated resources subsets remain unmonitored. This enables low requirements and high communication efficiency. By using merely the resource sub-subset from the resource subset, collision probability can be kept low.

According to an embodiment, the vehicle is configured to configure the wireless communication interface for receiving a signal from another vehicle in a resource area outside the resource subset, wherein the resource area is based on a tolerance range around the current position of the vehicle. The tolerance range can be based on at least one of the following aspects, namely a position that can be reached by the vehicle within a predefined time span, such as a radius around the current position and/or points along predefined routes or the same; positions within a predefined distance around the vehicle and/or a combination thereof. This means the vehicle can also receive such messages or can adjust its interface to already receive messages from those vehicles that come into consideration for a collision in a predetermined time interval and/or a predefined route interval.

According to an embodiment, the vehicle is configured to use the further resource subset based on an event. The event includes, for example, at least one of a deviation from a planned route of the vehicle in a spatial area, such that based on the deviation from the route other vehicles in a cell subsequently crossed by the vehicle can be informed on the future position of the vehicle, such as by switching to another cell/spatial area; and/or a deviation from a planned route of the vehicle in a spatial area to inform other vehicles in adjacent cells on the future position of the vehicle, i.e., vehicles that possibly enter the cell, the spatial area. According to an embodiment, the vehicle is configured to obtain spatial information indicating a location of the first and second partial area in the total area associated to an allocation of the resource subsets in the partial areas. For example, some sort of map or database can be available for the vehicle, such that the vehicle knows what resource subsets are to be used in what spatial areas, which can relate to transmitting and/or receiving signals.

According to an embodiment, the vehicle is configured to obtain a wireless configuration signal from the wireless communication network that includes instructions to use, at a position of the vehicle in a specific partial area, resources of the resource subset allocated to the partial area for decentralized communication. This allows a stringent limitation of the resource space for the vehicle and a simple coordination for a superordinate network.

According to an embodiment, the vehicle is configured to perform decentralized communication based on a synchronization provided by network control means of the wireless communication network. This means the decentralized communication can be incorporated in a synchronization pattern, which allows a high number of decentralized communications within the network.

According to an embodiment, the vehicle is configured to emit the position signal such that the information associated with the vehicle position of the vehicle in the spatial area comprises information regarding a deviation from a planned route of the vehicle in the spatial area. This allows informing other vehicles quickly about a deviation from the route, such that high speeds are allowable and/or short reaction times are possible.

According to an embodiment, the vehicle is configured to transmit an error at the vehicle to the wireless communication network by using centralized communication. This allows transmitting further information that are, at first, possibly less relevant or even insignificant for other vehicles, for example for re-planning their routes, to central means that can attempt to correct errors. For such a communication, latency taken into account therewith is possibly less critical.

According to an embodiment, the driving means comprises omnidirectional driving means, such as so-called omni-wheels. This allows changes of directions in a small space.

According to an embodiment, the vehicle is configured to move at a maximum speed that is at least 10 meters per second. This allows fast crossing of routes and is particularly advantageous in combination with low latencies as they are obtained by decentralized communication.

According to an embodiment, the vehicle is an automated guided vehicle, which is configured to move at least semi-autonomously in the spatial area. For such vehicles, decentralized communication is particularly advantageous.

According to one embodiment, the vehicle is configured as a load robot for transporting loads.

According to an embodiment, a vehicle includes a communication interface for providing wireless decentralized communication in a wireless communication environment. The vehicle includes driving means for moving the vehicle in a spatial area along a route. The vehicle is configured to receive a position signal comprising information associated with a vehicle position of another vehicle in the spatial area and to adapt the route of the vehicle based on the position of the other vehicle. By receiving the position information of the other vehicle by the decentralized communication, low latency can be obtained, such that fast reaction to the possibly unplanned position of the other vehicle is possible.

According to an embodiment, such a vehicle is also configured for transmitting its own position, for example by allowing bidirectional communication offset in time or simultaneously.

According to an embodiment, a wireless communication network includes a plurality of vehicles described herein.

According to an embodiment, the wireless network includes network control means configured to divide the spatial area into a plurality of partial areas. The network control means is configured to allocate, to each partial area, a resource subset of a total amount of wireless resources available in the wireless communication network, such that adjacent partial areas differ at least in one wireless resource. Here, the wireless communication network is configured to transmit an instruction by means of a configuration signal to the plurality of vehicles to use, at a positon of a respective vehicle in a specific partial area, resources of the resource subset allocated to the partial area for decentralized communication. Such a configuration can, for example, take place simultaneously by means of broadcast or groupcast to several vehicles but can also be performed individually for each vehicle.

According to an embodiment, the communication network is configured to join the partial areas without gaps, such that the vehicle can determine at any time in what partial area it currently is. For this, hexagonal partial areas are particularly suited.

According to an embodiment, the wireless communication network is configured to form partial areas adjacent to one another, such that, for example, a low or no overlap to adjacent partial areas results, which allows preventing ambiguities with respect to partial areas as they can result, for example, in radio cells of a mobile radio network.

According to an embodiment, the wireless communication network is configured to determine entry of a vehicle of the plurality of vehicles into one of the partial areas and to allocate a resource sub-subset of the resource subset allocated to the partial area to the vehicle for the decentralized communication of the vehicle. Thus, for example, a specific resource or resource sub-subset can be allocated to each vehicle, which the same has to use for transmitting its own message. Thereby, it is possible to keep a probability for collision with other radio signals low.

According to an embodiment, the wireless communication network is configured to allocate the resource subset from the resource subset to the vehicle according to a FIFO principle (first in-first out). Therefore, multiple allocation can be prevented and/or it can be determined in comparatively simple manner which resources are still available.

According to an embodiment, the wireless communication network is configured to determine the entry of the vehicle in advance in the context of route planning of the vehicle through the spatial area. This allows configuration in advance and hence prevention of additional latencies when crossing from one partial area to another.

According to an embodiment, the wireless communication network is configured to obtain information indicating an error at the vehicle of the plurality of vehicles and to exclude the respective vehicle from future resource allocation. This allows maintaining error-free communication of vehicles that are still in operation.

According to an embodiment, the network control means is configured to divide the total area into a plurality of partial areas and to allocate a resource subset multiple times to non-adjacent partial areas. This enables high resource efficiency in the wireless communication network.

According to an embodiment, network control means of the wireless communication network is configured to provide synchronization for the decentralized communication of the vehicles, which allows low collision numbers.

According to an embodiment, centralized communication to the plurality of vehicles and decentralized communication between the plurality of vehicles in the wireless communication is coexistent, which allows high flexibility.

Further embodiments relate to a method for operating vehicles and/or a wireless communication network as well as to computer programs and memory media on which the respective instructions are stored.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed below with reference to the drawings in more, it should be noted that identical, functionally identical or equal elements, objects and/or structures in the different figures are provided with the same reference numbers, such that the inscription of these elements illustrated in different embodiments is inter-exchangeable or inter-applicable.

Embodiments described below will be described in the context of a plurality of details. However, embodiments can also be implemented without these detailed features. Further, embodiments are described by using block diagrams instead of a detailed representation for clarity purposes. Further, details and/or features of individual embodiments can easily be combined with each other as long as this is not explicitly described to the contrary.

Figure 1:
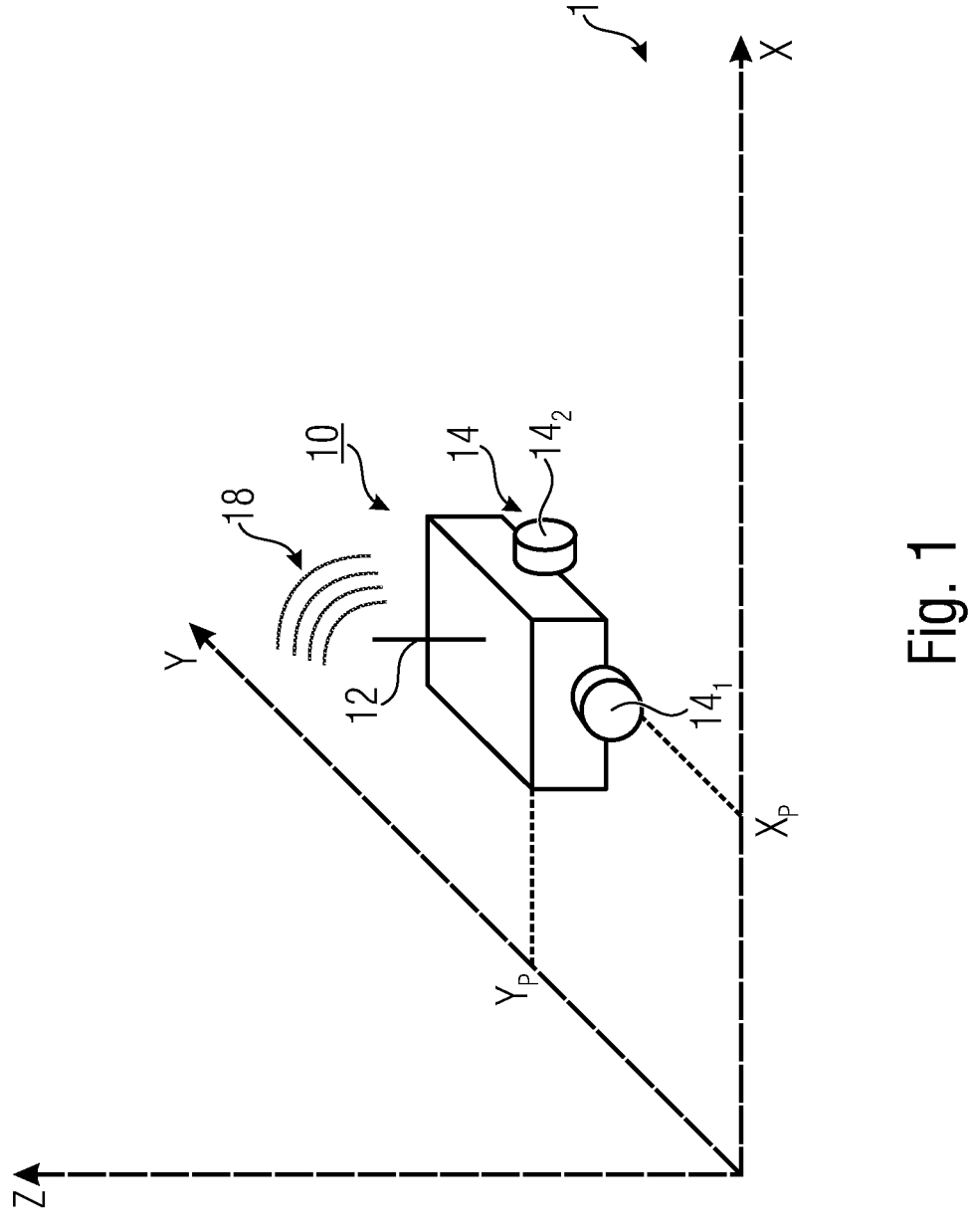
FIG. 1 is a schematic block diagram of a vehicle for transmitting a position signal according to an embodiment.

FIG. 1 shows a schematic block diagram of a vehicle 10 according to an embodiment. The vehicle 10 incudes a communication interface 12 for providing wireless decentralized communication in a wireless communication environment. The communication interface 12 is exemplarily illustrated as an antenna but can include a plurality of antenna elements configured at least for transmitting. Further elements allocated to the communication interface, such as amplifier elements and/or control means are not illustrated.

Further, the vehicle 10 includes driving means 14 for moving the vehicle 10 in a spatial area 16. The driving means 14 is illustrated exemplarily by means of two visibly illustrated wheels or rolls $14_1$ and $14_2$, which can be configured to move the vehicle 10 across a floor or another area. Neither the number of two rolls or wheels nor a specific position of the same is limiting for the present embodiments. For example, so-called omni-wheels are suitable for usage in the driving means 14 to allow a fast change of direction of the vehicle 10. However, in contrary to the specific illustration of FIG. 1, it is also possible that other types of driving means, such as crawler tracks, wires or the same are used, wherein it is also within embodiments to use another transport medium, such as water and/air.

The vehicle 10 is configured to emit a position signal 18 associated with a vehicle position of the vehicle 10 in a spatial area 16 or comprising information associated therewith, by means of the wireless decentralized communication by using the communication interface 12. This enables informing the wireless communication environment on the vehicle position.

In the embodiment of FIG. 1, the position of the vehicle 10 is determined, for example, by coordinates $x_P/y_P$ in a Cartesian coordinate system x/y/z. As an alternative to using a point $x_P/y_P$ as coordinates, it is also possible to use a spatial area, for example an extension along x, y and/or z as vehicle position. Not only when implementing the vehicle 10 for flying and/or diving but, for example, also when moving by means of a drive in several levels or floors, a z component of the vehicle position can also be part of the position signal 18, like the x component and/or y component. As an alternative to a Cartesian coordinate system, other local and/or global coordinates can be used to indicate the positon of the vehicle 10 at least in a local area as clearly as possible. Although the vehicle position indicated by means of the signal 18 can easily relate to a current vehicle position, the same can alternatively or additionally also relate to a future planned or unplanned vehicle position, for example a planned route and/or an adaptation of a planned route up to an at least so far unplanned route or the same. For this, for example, time information can also be part of the position information.

By means of the decentralized communication, the vehicle 10 can be configured to inform, by emitting the position signal 18, its environment and/or its position and/or its position change and/or its routes or the same.

Figure 2:
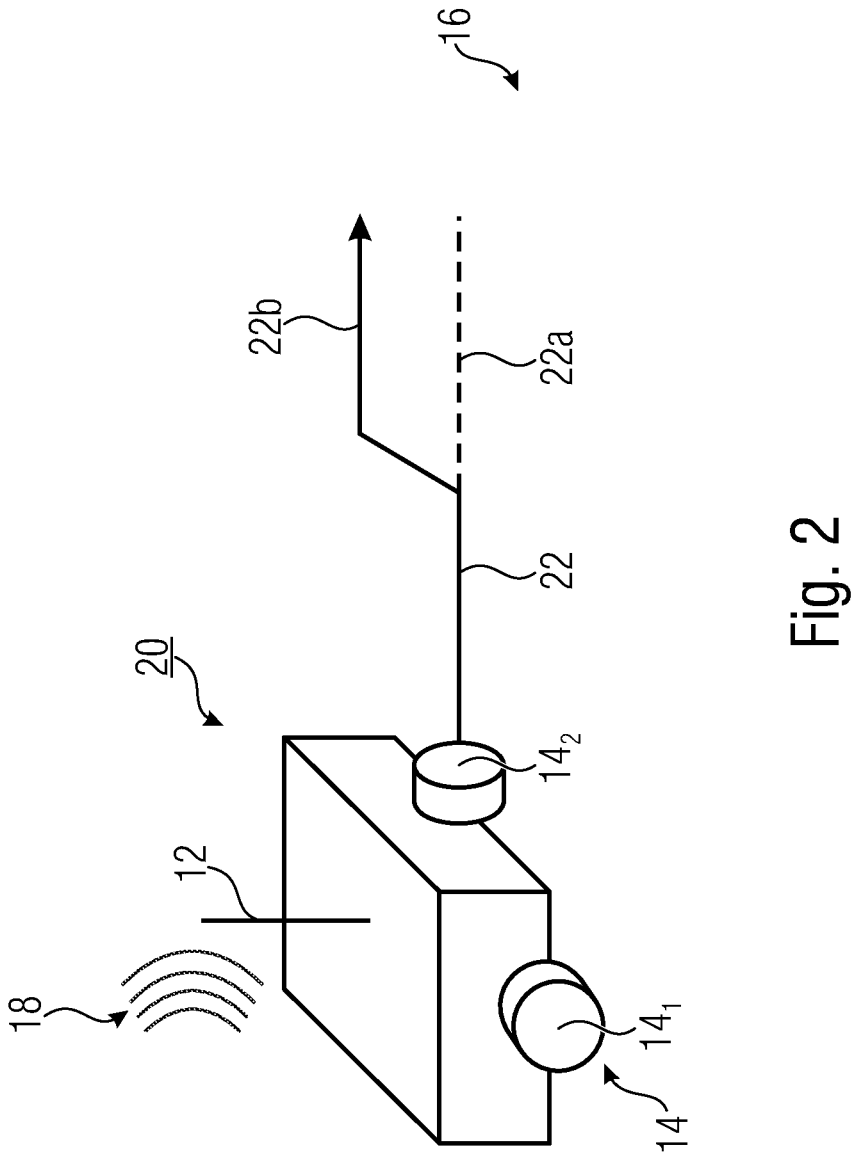
FIG. 2 is a schematic block diagram of a vehicle for receiving a position signal according to an embodiment.

FIG. 2 shows a schematic block diagram of a vehicle 20 according to an embodiment. The vehicle 20 also includes the communication interface 12 configured for the vehicle 20 for receiving wireless signals such that providing wireless decentralized communication in a wireless communication environment for the vehicle 20 relates at least to receiving wireless signals such as the position signal 18. The communication interface 12 can, for example, be configured for transmitting and receiving signals, for example offset in time or simultaneously. Alternatively, the communication interfaces of the vehicles 10 and 20 can also be implemented in a different manner, such that the one of the vehicle 10 is configured for transmitting the position signal 18 and the one of the vehicle 20 for receiving.

The vehicle 20 includes the driving means 14 for moving the vehicle in a spatial area, wherein the vehicle 20 is configured to perform this movement along a route 22.

The vehicle 20 is configured to receive the position signal 18 comprising information associated with the vehicle position of another vehicle, such as the vehicle 10, in the spatial area 16. The vehicle 20 is configured to adapt the route 22 based on the position of the other vehicle such that, for example, rescheduling from a previously planned route 22a to an updated route 22b takes place, which the vehicle 20 will then follow.

The spatial area 16 can include, for example, a network area, this means an area where a wireless network can be provided. For example, the spatial area 16 can be one or several halls, such as a predefined area where the vehicles 20 are configured for their movements.

The functions of the vehicles 10 and 20 can be combined. This means the vehicle 10 of FIG. 1 can be configured to receive a position signal of another vehicle comprising information associated with vehicle position of the other vehicle in the spatial area and to adapt an own route of the vehicle 10 based on the position of the other vehicle.

Alternatively or additionally, the vehicle 20 can be configured to emit an own position signal comprising information associated with the vehicle position of the vehicle 20 in the spatial area by means of the wireless decentralized communication to inform the wireless communication environment on the vehicle position of the vehicle 20.

Figure 3:
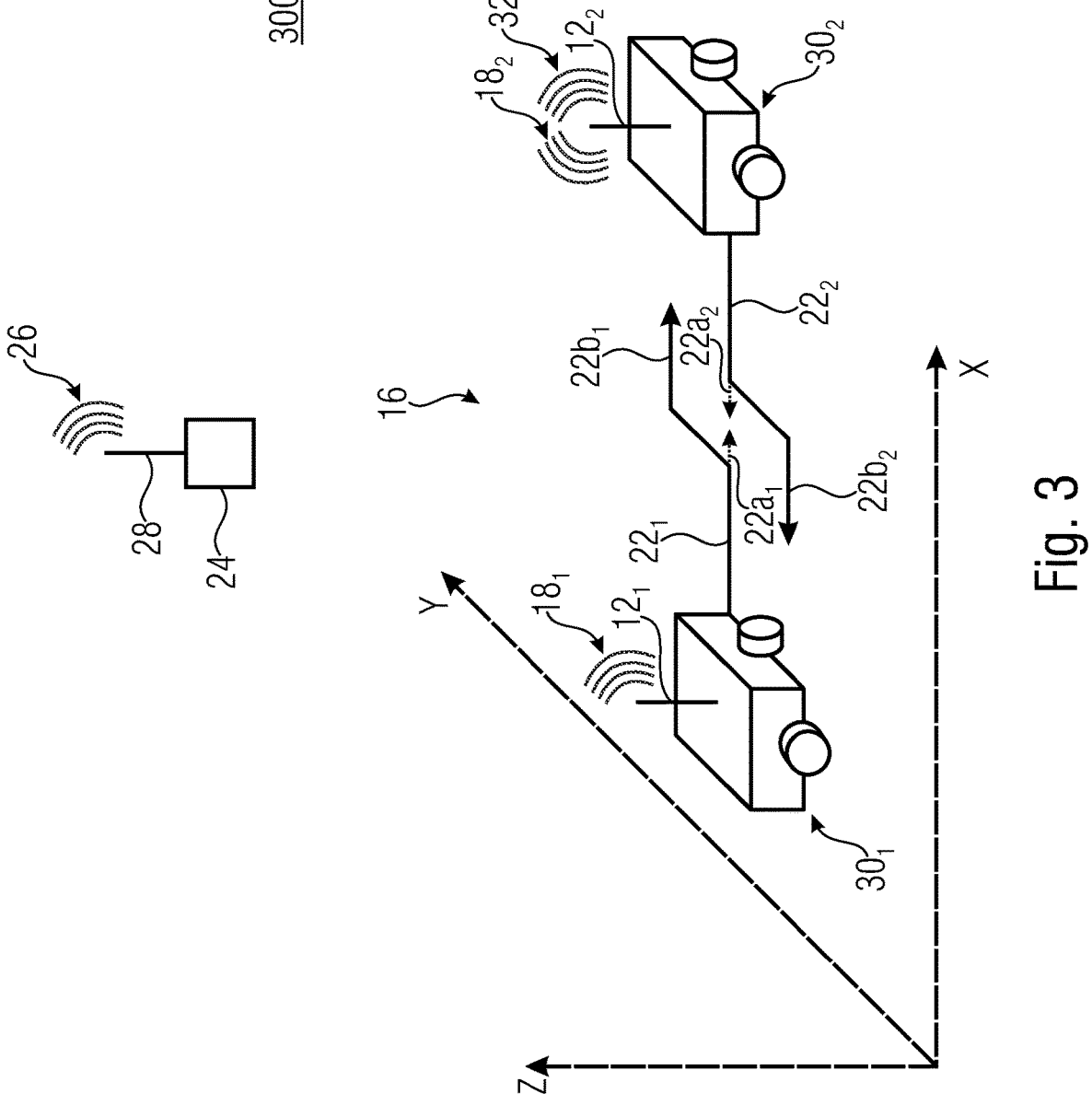
FIG. 3 is a schematic perspective view of at least part of a wireless communication network according to an embodiment.

FIG. 3 shows a schematic perspective view of at least a part of a wireless communication network 300 according to an embodiment. The wireless communication network 300 includes, for example, at least two vehicles $30_1$ and $30_2$ that exemplarily combine the functions of the vehicles 10 and 20, i.e., they are configured for transmitting, receiving and processing position signals. In alternative embodiments, it is sufficient to provide at least a vehicle 10 and at least vehicle 20, wherein any number of vehicles 10, vehicles 20 and/or vehicles 30 can be provided. In the context of interoperability, further network participants can be provided that are arranged in the spatial area 16 in a moveable or immovable manner.

According to an embodiment, the wireless communication network 300 includes network control means 24 configured to transmit, by means of wireless signals 28, information to the vehicles $30_1$ and/or $30_2$, which can, for example, use a wireless communication interface 28 which can be structured in a same or similar manner as the wireless communication interface 12. While the vehicles $30_1$ and $30_2$ communicate in a decentralized manner with each other, such as by means of peer-to-peer, communication provided by the network control means 24 can be centralized communication. For example, the network control means 24 can implement a base station of the wireless communication network 300. The wireless signal 26 can, for example, transmit information and/or configurations to the vehicles, for example for an individual vehicle, for a group of vehicles or for all vehicles, this means as unicast, groupcast or broadcast. In the described embodiment, decentralized communication coexists with the centralized communication, which can also be referred to as base station-based or infrastructure communication.

Although it can be sufficient to provide unidirectional communication for the communication between vehicles $30_1$ and $30_2$, the explanations herein are related to bidirectional communication.

Radio technology used for the communication between the vehicles $30_1$ and $30_2$ and/or for the communication between the network control means 24 and the vehicles includes, for example, Bluetooth, wireless local area networks (WLAN), LTE or 5G, wherein also different communication technologies can be combined. Embodiments described herein are particularly suitable for the implementation of WLAN or 5G.

The position signal 18 can be formed and emitted by a respective vehicle such that the information associated with the vehicle position of the respective vehicle in the spatial area 16 comprises information with respect to a deviation from a planned route $22_1$ or $22_2$ of the vehicle in a spatial area. Thus, for example, information can be provided that the route is changed to the route $22b1$ or $22b2$, wherein this can take place, for example, by indicating direction vectors, waypoints or route indices or the same.

The vehicle 10, 20 and/or 30 can be configured to transmit a wireless signal 32 to the wireless communication network 300. By means of the signal 32, information not needed for immediate route planning or exceeding the same can be transmitted to the wireless communication network 30, for example the presence of an error at the respective vehicle and/or details regarding such errors but also a position where the vehicle is currently located. The signal 32 can be transmitted to the wireless communication network 30, such as the network control means 24, for example by using centralized communication. This allows, for example, fast re-scheduling of the route $22_1$ of the vehicle $30_1$ by using the position signal $18_2$ as well as the possibly less time-critical information of the network 300 on an error at the vehicle $30_2$.

The vehicle 10, 20 and/or 30 can, for example, be configured to move at maximum speeds which can, for example, be 10 meters per second, at least 15 meters per second or at least 20 meters per second. This is particularly advantageous for the usage of omnidirectional driving means, such as omni-wheels, for the driving means.

Referring again to the network control means 24, embodiments provide that the same provides synchronization of the decentralized communication in the wireless communication network 300. For example, a timing and/or a frame or protocol can be predetermined, within which the vehicle 30₁ and 30₂ can communicate with each other. This allows that a vehicle emits a signal that is received by several vehicles and/or that a vehicle can reliably receive signals from different other vehicles. Here, for example, the PTP (position time protocol) can be applied, as the same can be implemented without great overhead, such that by saving the overhead fast communication is enabled. Alternatively or additionally, the network control means 24 can be configured to synchronize a synchronization of a centralized communication possibly coexisting with the decentralized communication.

The vehicles 10, 20 and/or 30 can represent, for example, an automated guided vehicle, AGV, that is configured to move at least semi-autonomously in the spatial area. Semi-autonomous means that possibly boundary conditions are transmitted to the vehicle, such as maximum speeds, times to be kept, routes, energy consumption or the same. Alternatively, the vehicles can also be fully automated, completely or partly, which means the driving decisions or whether a drive takes place at all, can be made by the vehicle itself, for example, in the context of a swarm decision. The vehicles can, for example, be formed as load robots for transporting loads such as in logistic centres, warehouses or sorting systems.

In other words, embodiments are based, among others, on the finding that events, which are not planned, for example, such as when a vehicle drives slower than planned or even has to stop, are to be communicated particularly fast to some, several or all surrounding vehicles to prevent larger damage such as by collisions. A basic possibility of solving the problem are radio-based infrastructures such as WLAN or 5G. The vehicles can communicate and exchange data via these networks. The disadvantage is, however, that the connection to a vehicle which is possibly only a few meters away from another vehicle is conventionally routed via a central node, such as the WLAN router or the cell tower. This detour takes a certain amount of time, not least for the data needed for the infrastructure, such as handshakes or authentication signals. Such latencies can also be relatively small, however, there is no guarantee for this. Additionally, already very small latencies can have a negative effect at very high vehicle speeds.

This will be explained based on an example. When communication via a router is assumed from a first vehicle to the router and from there to a second vehicle with a respective latency of 25 milliseconds, in this example, an overall latency of 50 milliseconds of vehicle 1 to vehicle 2 is obtained. At a speed of 10 meters per second, for example, both vehicles have moved by 0.5 meter each at this time until the network packet of the respective other vehicles has reach the vehicles at all. In an extreme case, the vehicles in this example have already moved towards each other by one meter. If a vehicle has just changed the axis point and is still in the authentication phase (such as 4-path handshake, see, for example, the pairwise master key identifier PMKID), the latency can briefly increase to 100 milliseconds, which can have fatal consequences in the case of an error at the vehicles.

Starting from this scenario, embodiments can be understood such that the central node is bypassed and a local peer-to-peer connection between the two vehicles is established. In known systems, this is not performed as such a method has the disadvantage that communication can only take place with those vehicles that are present in a local environment. However, in the application cases of the present embodiment, exactly this circumstance is desirable as only the vehicles in the local environment are relevant for the information provided by the vehicle.

Figure 4:
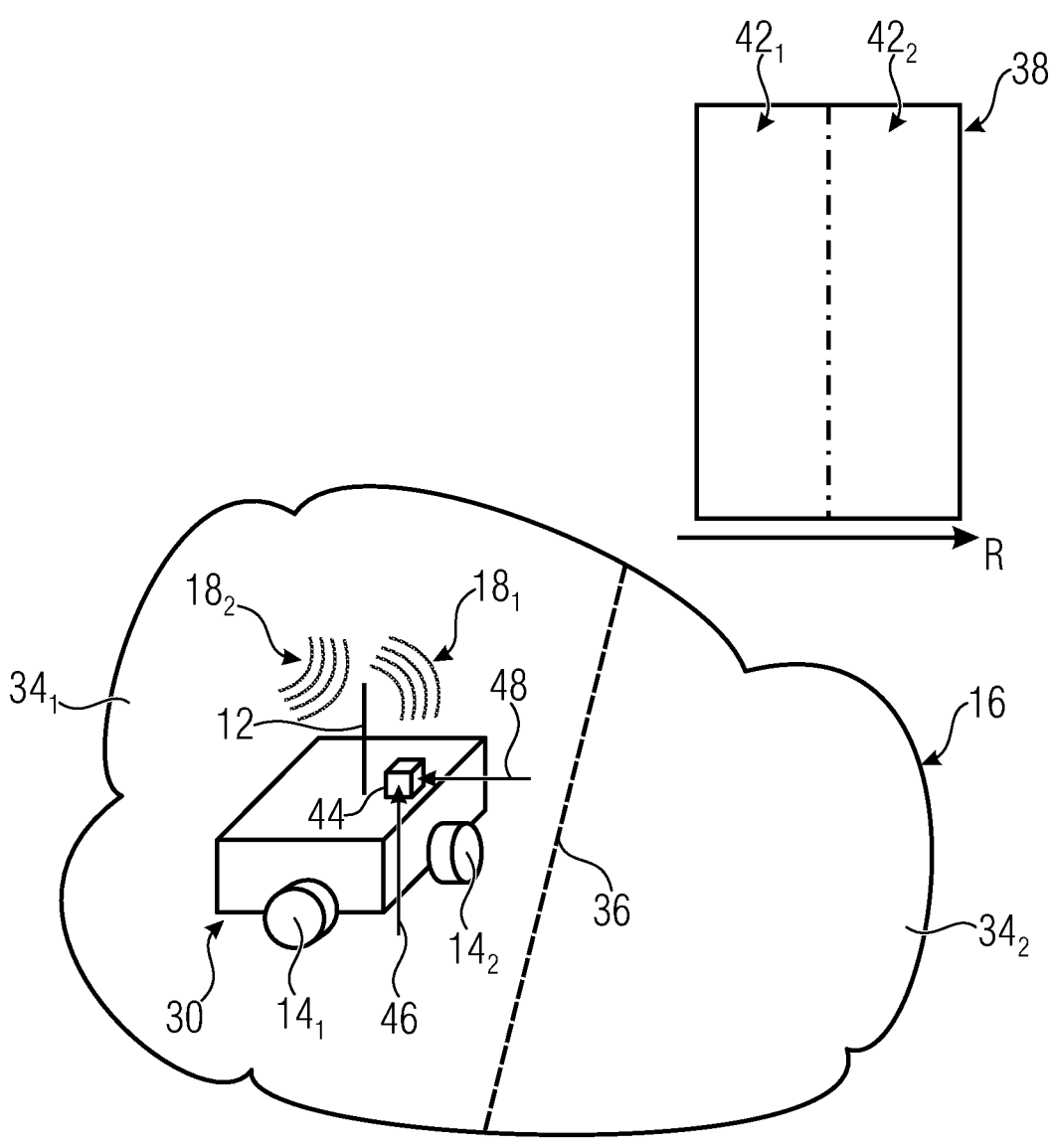
FIG. 4 is part of a spatial area of a wireless communication network according to an embodiment.

The following embodiments describe further advantageous configurations of the vehicles and the networks obtained therefrom. Some of these embodiments relate to resource allocation and/or resource usage in the network. Thus, for example, FIG. 4 shows part of the spatial area 16 as the same can be arranged, for example, in the wireless communication network 300.

Here, the vehicle 30 implements the functionality of vehicle 10 and/or 20, i.e., the same is configured to transmit the position signal 18₁ and/or to receive and to process the position signal 18₂.

The spatial area 16 is exemplarily divided into at least two partial areas 34₁ and 34₂. The partial areas 34₁ and 34₂ can overlap, however, embodiments provide that adjacent partial areas 34₁ and 34₂ are directly adjacent such that, for example, a boundary 36 can separate both partial areas 34₁ and 34₂. With reference to the position information of the vehicle, simply put, the vehicle is either present in the partial area 34₁ or in the partial area 34₂.

The wireless communication network can provide for a usage of resources of a total amount 38 of available wireless resources. Here, resource means a frequency domain, a channel, a carrier, a code or a time domain or time slot that can separate the used medium either in the frequency domain, in the time domain and/or in the spatial area. The total amount 38 can be divided into subsets 42₁ and 42₂, for example by the network control means 24. The respective resource subset 42₁ or 42₂ of the total amount can be allocated to one or several partial areas 34₁ or 34₂, wherein adjacent partial areas 34₁ and 34₂ comprise different allocated resource subsets 42₁ and 42₂. The subsets can differ from one another in at least one of a frequency domain, a channel, a carrier, a code and a time domain or time slot. While it is not needed, it is advantageous that the resources R behave disjoint with respect to each other in regard to the resource subsets 42₁ and 42₂, such that a resource included in the subset 42₁ is not included in the subset 42₂ and vice versa.

The vehicle 30 can comprise control means 44, wherein the control means 44 can also be provided in vehicles 10 and/or 20. The control means 44 can be configured to obtain partial area information 46 indicating a division of the spatial area 16 into the partial areas 18₁ and 18₂, for example by means of a signal provided by the network control means, such as the signal 26. In the same signal or a further signal, the control means 44 can obtain resource information 48 on a first resource subset 42₁ of the total amount 38 of available wireless resources of the wireless communication environment allocated to the first partial area and information on a second resource subset 42₂ of the total amount 38 allocated to the second partial area 34₂. Transmitting the partial area information 46 and/or the resource information 48 to the vehicle 44 can take place in a wireless manner, but this is not mandatory. As vehicles normally remain in one spatial area 16 for a longer time period, respective information can, for example, be transmitted to the vehicle also in a wired manner.

The control means 44 can be configured to control the communication interface 12 in dependence on a position of the vehicle in the spatial area 16. At a position in the partial area 34₁, control can take place such that the position signal 18₁ is emitted by using the resource subset 42₁ and at a position in the second partial area 34₂ the same is emitted by using the resource subset 42₂.

In other words, the vehicle 30 informs its environment on its position by using different resource subsets depending on the partial area 34₁ or 34₂ the same is located in.

Figure 5:
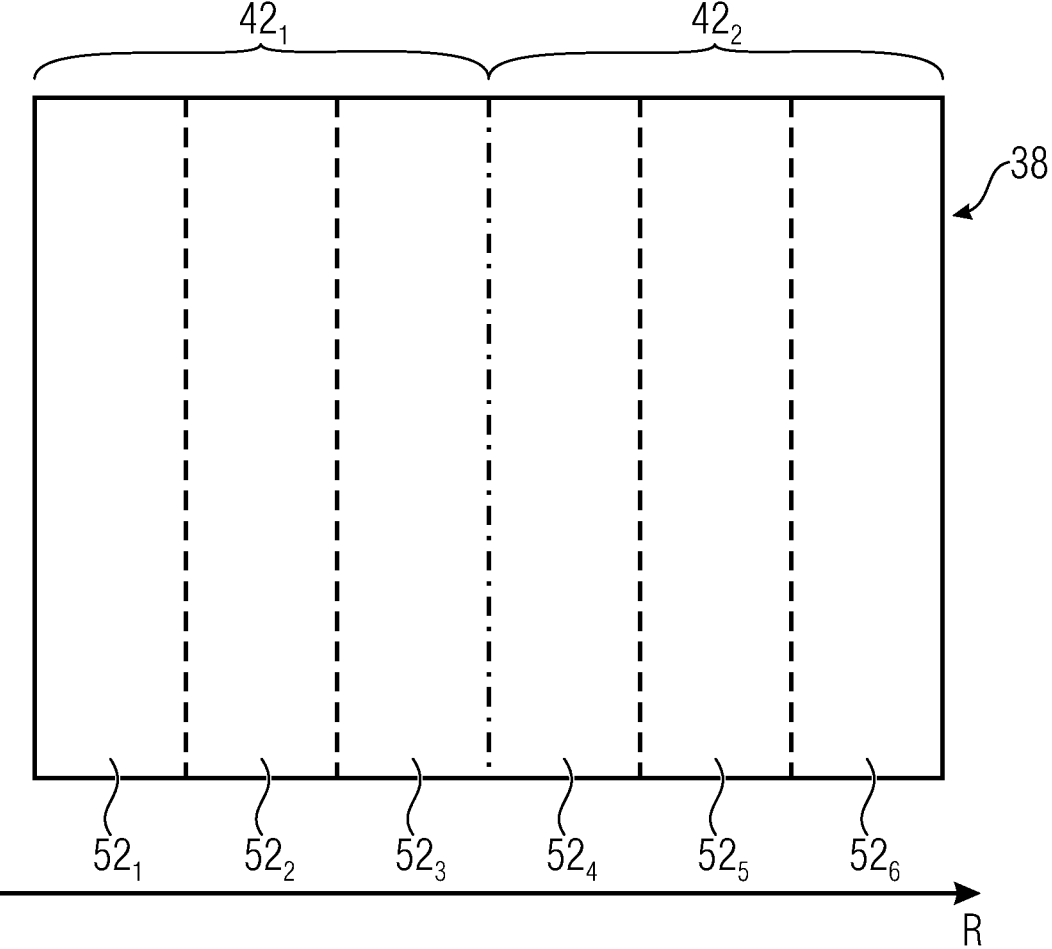
FIG. 5 is a schematic illustration of a division of resource subsets into resource sub-subsets according to an embodiment.

FIG. 5 shows a schematic illustration of a division of resource subsets 42₁ and 42₂ into resource sub-subsets 52₁ to 52₆. It is obvious that both the number of resource subsets 42₁ and 42₂ as well as the number of three resource sub-subsets 52₁ to 52₃ or 52₄ to 52₆ each for a respective resource subset 42₁ or 42₂ is exemplarily. A number of resource subsets can deviate from a number of two and can be, for example, least two, at least three, at least four, at least five or more. Alternatively or additionally, a number of resource sub-subsets 52 in a respective resource subset can be a number of at least two, at least three, at least five, at least ten or more. Different resource subsets can comprise the same or a differing number of resource sub-subsets.

In the present embodiment, the resource R is illustrated in a one-dimensional manner, wherein this is not limiting but merely exemplary. For example, the present resource is a specific frequency domain, a time slot or a code or a spatial area. According to embodiments, the resource space or the total amount 38 can also be divided in a multi-dimensional manner, such as in a frequency/time grid, a time/code grid or the same.

Although transmitting the position signal can also take place by using the entire resource subset 42₁ or 42₂, embodiments provide for using merely part thereof, a resource sub-subset 52ᵢ. While it can be helpful to monitor the respective entire resource subset 42₁ or 42₂ for a reception of a position signal 18, based on the allocation of the resource subset 42₁ or 42₂ to a partial area 34₁ or 34₂, part thereof, namely a resource sub-subset 52ᵢ with i=1, . . . , 3 or i=4, . . . , 6 can be sufficient to transmit a respective signal. This means the vehicle can be configured to transmit the position signal in a respective partial area by using a resource sub-subset 52ᵢ of the resource subset 42₁ or 42₂. For receiving a position signal or another signal from another vehicle, an increased resource space can be monitored. According to an embodiment, this can, for example, be the entire resource subset 42₁ or 42₂. According to embodiments, it is intended that the allocation of a resource sub-subset to a vehicle in the respective partial area takes place exclusively, such that the vehicle or the control means 44 can assume that, in the respective partial area, no other vehicle uses the resource sub-subset for transmitting, such that the own resource sub-subset can also be excluded from the receive filters.

On the other hand, further resource areas can be monitored for a reception of a signal, for example those resource partial areas that are allocated to adjacent spatial partial areas, which can in particular be relevant in boundary areas of the spatial areas. This means the vehicle can be configured to configure the communication environment for receiving a signal from another vehicle outside the resource sub-subset allocated to the current partial area.

A respective vehicle according to an embodiment can be configured to configure the wireless communication interface for receiving a signal from another vehicle in a resource area outside the resource subset that is allocated to the own position. Such a resource area can, for example, be based on a tolerance range around the current position of the vehicle.

The tolerance range can be based, for example, on a position that can be reached by the vehicle within a predefined time span, i.e., on a time component. Alternatively or additionally, the tolerance range can be based on which position are located within a predefined distance around the vehicle and/or a combination thereof, i.e., a spatial component. Thus, for example, assuming that a safe reaction to amended boundary conditions can take place within a predefined time window by considering the vehicle speed and/or assuming that the vehicle can move within a specific radius until safe shutdown, can be the basis for this tolerance range.

Referring again to the spatial division of the resource area also for transmitting the position signal, it is within the scope of some embodiments that vehicles emit the position signal several times by using a further resource subset, for example for informing vehicles in an adjacent partial area on the own position, position development and/or route, such as by using the resource subset that is allocated to the adjacent partial area. Here, it can have the same effect to transmit the position signal by using several resources or several position signals of the same content by using several resource subsets and/or resource sub-subsets.

According to an embodiment, the vehicle is configured to use the further resource subsets based on an event. Here, an event can, for example, be an unplanned event needing changing pre-planned routes and/or speed profiles. For example, the event can include a deviation from a planned route of the vehicle in the spatial area, such that, based on the deviation, other vehicles in a cell crossed subsequently by the vehicle or several cells subsequently crossed can be informed on the current and/or future position of the vehicle. For example, it can be needed that the vehicle deviates into other cells, such that these cells or the vehicles located therein or yet to arrive therein are informed on the avoidance manoeuvre. Alternatively or additionally, the event can include a deviation from a planned route of the vehicle in the spatial area to inform other vehicles in adjacent cells on the future position of the vehicle such as when the vehicle decelerates or stops, e.g. due to damage. Therefore, it can be implemented to inform beyond the resource subset allocated to the present partial area relevance such as adjacent partial areas and/or to listen for signals transmitted there.

With reference to the wireless communication network 300 of FIG. 3 and the explanations of FIGS. 4 and 5, an embodiment will be discussed according to which a vehicle such as the vehicle 10 or 30 is configured to obtain spatial information indicating a location of the first and second partial areas in the total area 16 allocated to an allocation of the resource subsets to the partial areas. For this, FIG. 6 shows, for example, a schematic illustration of the spatial area 16 in the form of a two-dimensional map, wherein the illustration in two dimensions is exemplarily and not limiting as, for example, also a third dimension can be used for the spatial division such as different height levels or layers or floors.

The network control means is configured, for example, to divide the total area 16 into a plurality of partial areas 34ⱼ and further to allocate a resource subset 42ₖ multiple times to non-adjacent partial areas.

In the map, the spatial area 16 is exemplarily divided into several partial areas 34ⱼ, with j=1, . . . , n. Further, a resource subset 42ₖ with exemplarily k=1, 2, 3 is allocated to each partial area 34ⱼ. Thus, for example, the total amount 38 of the resources is divided into three resource groups or resource subsets 42, wherein one of the resource subsets can be allocated to each partial area 34. For example, by using the network control means 24, dividing the resources to the spatial area can take place such that adjacent spatial areas are allocated to different resource subsets, in particular disjoint resource subsets, but a respective resource subset can be repeatedly used in the spatial area 16. A respective reuse factor of the resource re-usage can be adjusted in an arbitrary manner. For the partial area $34_4$, for example, the resource subset $42_3$ is provided. However, the resource subset $42_1$ is allocated, for example, to two adjacent partial areas $34_5$ and $34_6$. To prevent collisions that possibly occur in the partial area $34_4$, the reuse factor can be reduced in order to increase the distances between two cells to which the same resource subsets 42 are allocated.

Figure 6:
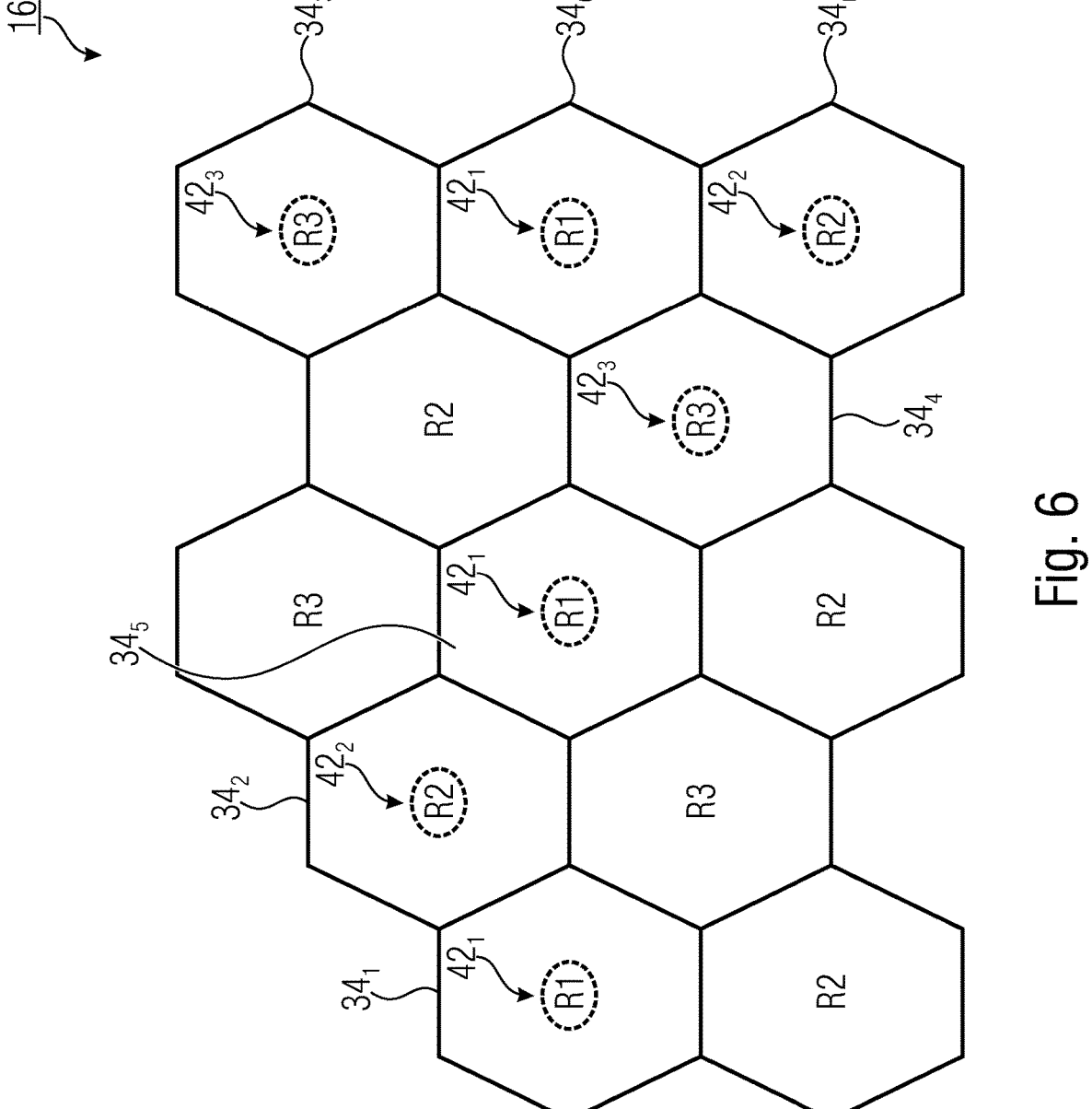
FIG. 6 is a schematic illustration of the spatial area in the form of a two-dimensional map wherein the spatial area is divided into hexagonal cells.

Here, the division of the spatial area 16 illustrated in FIG. 6 is provided, for example, in the form of hexagonal cells joined without any gaps. Both the hexagonal shape as well as the joining without gaps is optional. For example, areas can be excluded and gaps can result where it is determined a priori that no vehicles will drive there. Further, any other shape of the cells can be implemented, wherein hexagons are particularly well-suited for joining without gaps. Basically, the selection of the shape of a cell is random or arbitrary. Each geometric shape which allows gapless tessellation can be implemented. Here, a possible combination of such embodiments should also be mentioned. For example, a partial area can be divided into further sub-partial areas and/or, considered the other way round, a combination of at least two partial areas can be controlled as one effective partial area. For example, one resource subset overall can be allocated to such a combination, and one part of the resource subset each to the sub-partial areas, which optionally but not mandatorily allows further division according to the statements regarding the resource sub-subsets. In one example, for example two (or more) of the illustrated partial areas or hexagons can be considered or managed as a common area by the management or the network control means, to each of which, for example, only half as many resources are allocated as to the surrounding partial areas. This can be advantageous when, in the context of network control and/or network configuration, it can be assumed that only so many vehicles drive through this combined larger area (such as formed of two hexagons) in total as through all surrounding small areas. Therefore, the option of spatial enlargement and locally different sizes of the partial area, position accuracy can still be maintained or improved by dividing the resources within such areas.

Referring again to FIG. 5, it is possible to allocate to the respectively allocated resource subset 42 with respect to a resource to be used by the specific vehicle, a resource sub-subset 52 of the subset $42_k$ for transmitting.

The information on the division of the spatial area 16, the allocation of the resource subsets $42_k$ to the spatial areas $34_j$ and/or further information can be transmitted to the vehicles by the network control means, but can also be transmitted to the vehicles within a setup or means of the wireless communication network in any form. One embodiment according to which a vehicle receives a wireless configuration signal, such as the signal 26, from the wireless communication network and evaluates the same on an instruction to use, at a position of the vehicle in a specific partial area $34_j$, specific resources of the resource subset $42_k$ allocated to the partial area $34_j$ for decentralized communication, offers the possibility to provide reconfiguration also during operation. Such a configuration of the vehicle at the network can take place via infrastructure communication, i.e., centralized communication coordinated by some sort of base station.

A division of the spatial area 16 into a plurality of partial areas $34_j$ can, for example, take place by the network control means, which can take place in an automated manner and/or based on user input. Alternatively or additionally, a respective resource subset $42_k$ of the total amount 38 of wireless resources available for the wireless communication network can be allocated by the network control in an automated manner according to a rule (for example, specific reuse factors or the same). Thereby, adjacent partial areas differ in at least one wireless resource. Wireless configuration networks according to embodiments are configured to transmit an instruction to the plurality of vehicles by means of at least one configuration signal to use, at a position of a respective vehicle in a specific partial area, resources of the resource subset allocated to the partial area for decentralized communication.

According to an embodiment, dividing the resources into the partial areas can take place by applying a rule, which considers the expected communication density, such as an average value and/or a maximum value. Thus, for example, a lower number of resources can be allocated to partial areas having a low expected communication density compared to partial areas having a high expected communication density. Communication density means a number of vehicles that can communicate at the same time, i.e., for example are present at the same time in the partial area and possibly have one or several resource allocations for transmitting the position signal(s) at the same time. The communication density can be determined by means of previous considerations, calculations and/or simulations and/or can be determined during operation by means of measurements, such as by the network control.

The network control means can be configured to monitor usage of the resource subset during operation and/or to perform for dynamic resource allocation. The network control means can implement, for example, automated resource distribution. Automated resource distribution can make, for example, a number of resources allocated to a partial area dependent on the communication density. Also, a change of the allocation can take place, such that when a reduction of the maximum or average or minimum usage of a partial area is determined, a subset of resources of this partial area can be allocated to other partial areas and/or additional resources, for example those that are unused in other partial areas and/or from a reserve pool can be allocated to partial areas that have an insufficient number of resources due to increasing communication density. Alternatively or additionally, for example, unused resources that are withdrawn from a partial area can be assigned to such a reserve pool, which allows simple and fast determination of additional resources if a need for an increase of resources arises in a partial area. In other words, the distribution of the resources to the spatial areas, partial areas and/or sub-partial areas can take place according to the expected communication density or the number of vehicles that are to communicate. This can optionally take place in the context of automated resource distribution, which can be performed by the network control means, for example as dynamic resource allocation.

Referring again to FIG. 5, a vehicle moving, for example, from partial area $34_1$ towards partial area $34_2$ can have a priori knowledge that the resource subset $42_2$ is allocated to the partial area $34_2$. For crossing the positon or also in advance, the network control means determining an entry of the vehicle into one of the partial areas can allocate to the vehicle in advance, at the current time or afterwards, a resource sub-subset 52 of the resource subset $42_k$ allocated to the partial area for the decentralized communication of the vehicle. A priori allocation is also possible, however, the same has the disadvantage that it may happen that different vehicles having allocated, for example, the same resource sub-subset $42_i$ can be in the same cell, either in a planned or unplanned manner which can then result in collisions in the communication. Therefore, embodiments provide for a dynamic allocation of the resource sub-subset. According to an embodiment, the wireless communication network is configured to allocate the resource sub-subset from the resource subset to the vehicle according to the FIFO principle (First in-First out). When the vehicle enters or leaves the cell properly, the resource can again be released by the network control means or can be allocated to another vehicle.

Here, embodiments provide for determining the entry of the vehicle in advance in the context of route planning of the vehicle through the spatial area 16 by the network control means. This allows the reservation of specific resource sub-subset for specific times and to provide them in advance, which also allows for low computing power during operation.

According to an embodiment, the wireless communication network is configured to obtain information indicating an error at a vehicle of the plurality of vehicles, for example the signal 32. The respective vehicle can be excluded from future resource allocation by the wireless communication network.

This means the resources reserved for the vehicle can be allocated to other vehicles. Alternatively or additionally, for example when there is no exit of the vehicle, the resource sub-subset of the defect vehicle can remain allocated to the vehicle, such that the network control means can allocate other resources sub-subsets to other vehicles that were intended for the later usage of this resource sub-subset. This allows the defect vehicle to indicate its position to the other vehicles and to keep a probability of packet collision low.

In other words, resource distribution can be regulated in advance for the P2P connections and can take place via the regular radio connection, such as WLAN or 5G as the greater latency does not play any part here.

This radio connection can, for example, be referred to as global radio connection, whereas the P2P communication between the vehicles can be referred to as local radio connection. Embodiments provide that the vehicles know exactly how the resources of the local connections are distributed at any time. A basic idea is to divide the entire available driving area into small hexagonal cells like in mobile radio. A global coordinator, the network control means, allocates a set of the global available resources, such as bandwidth, time slots, subcarriers to each cell depending on the used network, which are then distributed further to the vehicles within the cell. Here, the resources of each cell are allocated to the vehicles according to the FIFO principle to those vehicles that cross the cell. This allocation also takes place in advance by the coordinator via the global radio connection.

Here, the term "resource" relates to different communication methods, and can be selected in a general way in embodiments, as the actual methods have different advantages, but is not absolutely relevant for the invention, how exactly the so-called multiple access is regulated. This can take place either in frequency division multiple access (FDMA), merely in time division multiple access (TDMA) or in orthogonal frequency division multiplex (such as OFDM+TDMA). Specifically, this means that a specific number of frequency bands or carriers (for OFDM) and/or time slots can be allocated to each cell which can then be distributed further to the vehicles within the cells.

Additionally, the coordinator can perform time synchronization such as via the precision time protocol (PTP). This can be advantageous, for example, when using TDMA, since in P2P communication the data can be transmitted directly without any preceding synchronization signal. Thereby, the time overhead of the communication can be reduced further.

The allocation of the radio resources to the individual cells can be stored by the coordinator in some sort of map, which is made known to all vehicles via the global connection. In contrary to that, the division of the resources in an individual cell to the crossing vehicles can be regulated differently, for example the same may not be globally known as this information is not relevant at first. Each vehicle knows its own resource that it may use for transmitting when crossing. Additionally, the vehicle listens for all other free resources of its own cell and the cells that it will cross in the near future. The near future can mean, for example, the minimum number of cells that would still be crossed on the current path in case of an emergency stop. This can form a useful lower limit under the consideration that when listening for less cells possibly not enough time would remain or a route that is too short would remain for avoiding a possible obstacle. In contrary, a useful upper limit can be determined in that cells are not listened to that are crossed past the predetermined distance or past the predetermined threshold, for example 1 minute, 5 minutes or 10 minutes. The exact time and/or path can be selected in dependence on the speed of the vehicle, the size of the cells and the used radio method.

If a vehicle, for example, deviates unexpectedly from its route, it can inform all surrounding vehicles that are potentially affected by this deviation or could be affected as they all listen to the resources in their surrounding cells, on the radio resource allocated to the same for the current and/or several next cells. In that way, it is possible to react on an error fast and with lower or even minimum latency time. The more complex processes needed to come out of the error case, for example, can be regulated via the global connection as the higher latency is not relevant here. Therefore, coexistence of decentralized and centralized communication can be useful. If a vehicle is completely immobile within a cell due to technical defect, an error state can be reported to the coordinator via the global connection and the resource allocated to the vehicle can be removed from the FIFO chain and cannot be distributed again. The vehicle can then transmit its current state and/or position permanently on its allocated channel, the allocated resource and can operate in a similar manner as an emergency buoy.

It should be noted that the global distribution of the radio sources by the coordinator does not necessarily take place exclusively. This means specifically that, for example, a specific frequency band can be used simultaneously by more than one cell when the cells are far enough apart from each other, such that it becomes clear, for example by the signal strength of the received signal, which one belongs to the closest cell. Cell towers of a provider can be used as analogy, which also all transmit on the same frequency band, but are, however, so far apart from each other that a mobile phone knows to which tower it optimally connects.

Embodiments allow a very small latency in communication. Due to the fact that each vehicle has allocated a fixed resource, for example a time slot on a specific frequency band in its current and all surrounding cells at any time, and additionally the resources of the surrounding cells to be listened for are known by the coordinator, communication can take place directly with the relevant surrounding participants.

According to an embodiment, a method for operating a vehicle, such as the vehicle 10, comprises providing wireless decentralized communication in a wireless communication environment, moving the vehicle in a spatial area, such as a hall or a time domain, and emitting a position signal comprising information associated with a vehicle positon of the vehicle in the spatial area by means of the wireless decentralized communication in order inform the wireless communication environment on the vehicle position.

According to an embodiment, a method for operating a vehicle, for example the vehicle 20, comprises providing wireless decentralized communication in a wireless communication environment, moving the vehicle in a spatial area along a route and receiving a positon signal comprising information associated with a vehicle position of a different vehicle in the spatial area as well as adapting the route of the vehicle based on the position of the other vehicle.

For operating a wireless communication network according to an embodiment, a method used herewith includes operating a vehicle for transmitting the position signal and operating a vehicle for receiving the position signal as well as for adapting the route of the vehicle.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer. A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A vehicle comprising:
a communication interface for providing wireless decentralized communication in a wireless communication environment,
wherein the vehicle is configured to emit a position signal comprising information associated with a vehicle position of the vehicle in a spatial area by means of the wireless decentralized communication to inform the wireless communication environment on the vehicle position,
wherein the position signal is a first position signal, and
wherein the vehicle is configured to receive a second position signal comprising information associated, by a used resource for transmitting the second position signal, with a vehicle position of a different vehicle in the spatial area and to adapt a route of the vehicle based on the vehicle position of the different vehicle; and
a controller configured to acquire partial area information indicating a division of the spatial area into a first partial area and into a second partial area and to acquire resource information on a first resource subset of a total amount of available wireless resources of the wireless communication environment allocated to the first partial area and resource information on a second resource subset of the total amount of available wireless resources of the wireless communication environment allocated to the second partial area, wherein the controller is configured to control the communication interface in dependence on a position of the vehicle in the spatial area to emit, at a first position in the first partial area, the position signal by using a resource of the first resource subset and to emit, at a second position in the second partial area, the position signal by using a resource of the second resource subset, and wherein the vehicle is configured to emit the position signal or a further position signal of a same content also by using a further resource subset that is allocated to the vehicle for an adjacent partial area.

2. The vehicle according to claim 1, wherein the vehicle is configured to transmit the position signal in a respective partial area by using a resource sub-subset of the resource subset and to configure the wireless communication environment for receiving a signal from another vehicle outside the resource sub-subset in the resource subset.

3. The vehicle according to claim 1, wherein the vehicle is configured to configure the communication interface for receiving a signal from another vehicle in a resource area outside the resource subset, wherein the resource area is based on a tolerance range around a current position of the vehicle, wherein the tolerance range is based on at least one of:

positions that can be reached by the vehicle within a predefined time span;

positions within a predefined distance around the vehicle; and a combination thereof.

4. The vehicle according to claim 1, wherein the vehicle is configured to acquire spatial information indicating a location of the first partial area and the second partial area in a total area, associated to an allocation of the first resource subset and the second resource subset to the first partial area and the second partial area, respectively.

5. The vehicle according to claim 1, the controller is configured to acquire a wireless configuration signal from a communication network that comprises instructions to use, at a position of the vehicle in a specific partial area, resources of the first resource subset and the second resource subset allocated to the first partial area and the second partial area for decentralized communication.

6. The vehicle according to claim 1, the controller is configured to emit the position signal such that the information associated with the vehicle position of the vehicle in the spatial area comprises information regarding a deviation from a planned route of the vehicle in the spatial area.

7. The vehicle according to claim 1, the controller is configured to transmit an error at the vehicle to a communication network by using centralized communication.

8. The vehicle according to claim 1, wherein a driver of the vehicle comprises an omnidirectional driver or a load robot for transporting loads.

9. A vehicle comprising:

a communication interface for providing wireless decentralized communication in a wireless communication environment, wherein the vehicle is configured to receive a position signal comprising information associated with vehicle position of another vehicle in a spatial area and to adapt a route of the vehicle based on a position of the another vehicle, wherein the position signal is a first position signal, and wherein the vehicle is configured to transmit a second position signal comprising information associated, by a used resource for transmitting the second position signal, with a vehicle position of the vehicle in the spatial area to inform the wireless communication environment on the vehicle position; and a controller configured to acquire partial area information indicating a division of the spatial area into a first partial area and into a second partial area and to acquire resource information on a first resource subset of a total amount of available wireless resources of the wireless communication environment allocated to the first partial area and resource information on a second resource subset of the total amount of available wireless resources of the wireless communication environment allocated to the second partial area, wherein the controller is configured to control the communication interface in dependence on a position of the vehicle in the spatial area to determine a position of a vehicle transmitting the position signal at a first position in the first partial area based on a used resource of the first resource subset and to receive, associated with a second position in the second partial area, the position signal by using a resource of the second resource subset, and wherein the vehicle is configured to receive the position signal or a further position signal of a same content also by using a further resource subset that is allocated to the vehicle transmitting the position signal for an adjacent partial area.

10. The vehicle according to claim 9, wherein the vehicle comprises a controller configured to acquire partial area information indicating a division of the spatial area into a first partial area and into a second partial area and to acquire resource information on a first resource subset of a total amount of available wireless resources of the wireless communication environment allocated to the first partial area, and information on a second resource subset of the total amount of available wireless resources of the wireless communication environment allocated to the second partial area;

wherein the position signal is emitted at a first position of another vehicle in the first partial area by using a resource of the first resource subset and, at a second position in the second partial area, the position signal is emitted by using a resource of the second resource subset.

11. The vehicle according to claim 9, wherein the position signal is a second position signal; wherein the vehicle is configured to emit a first position signal comprising information associated with a vehicle position of the vehicle in the spatial area by means of the wireless decentralized communication to inform the wireless communication environment on the vehicle position.

12. A wireless communication network comprising a plurality of vehicles wherein a vehicle of the plurality of vehicles comprising:

a communication interface for providing wireless decentralized communication in a wireless communication environment;

wherein the vehicle is configured to emit a position signal comprising information associated with a vehicle position of the vehicle in a spatial area using the wireless decentralized communication to inform the wireless communication environment on the vehicle position, and wherein the vehicle is configured to receive a position signal comprising information associated with vehicle position of another vehicle in a spatial area and to adapt a route of the vehicle based on a position of the another vehicle; and a network controller configured to divide the spatial area into a plurality of partial areas and to allocate each partial area a resource subset of a total amount of wireless resources available in the wireless communication network such that adjacent partial areas differ in at least one wireless resource, wherein the wireless communication network is configured to transmit, using at least one configuration signal to the plurality of vehicles, an instruction to the plurality of vehicles to use, at a position of a respective vehicle in a partial area, resources of the resource subset allocated to the partial area for decentralized communication, and wherein the network controller is configured to dynamically adapt the resource subset allocated to the partial area to a communication density of the partial area.

13. The wireless communication network according to claim 12, wherein the network controller is configured to determine an entry of a vehicle of the plurality of vehicles into one of the partial areas; and to allocate a resource sub-subset of the resource subset allocated to the partial area to the vehicle for decentralized communication of the vehicle.

14. The wireless communication network according to claim 13, wherein the network controller is configured to determine the entry of the vehicle in advance in a context of a route planning of the vehicle through the spatial area.

15. The wireless communication network according to claim 13, wherein the network controller is configured to acquire information indicating an error at a vehicle of the plurality of vehicles and to exclude the respective vehicle from future resource allocation.

16. The wireless communication network according to claim 12, further comprising a network controller configured to provide synchronization for decentralized communication of the plurality of vehicles, wherein the network controller is configured to perform synchronization based on a precision time protocol (PTP).

* * * * *